United States Patent [19]
Molyneux

[11] 3,798,528
[45] Mar. 19, 1974

[54] APPARATUS AND METHOD FOR DETECTING THE EVOLUTION OF GAS FROM AN ELECTRIC CELL AND FOR CONTROLLING THE CHARGING OF SAID CELL IN RESPONSE TO SAID DETECTION

[76] Inventor: Lindsay Molyneux, 4, Leazes Cres., Newcastle-Upon-Tyne, England

[22] Filed: Nov. 16, 1972

[21] Appl. No.: 307,146

Related U.S. Application Data
[63] Continuation of Ser. No. 140,043, May 4, 1971, abandoned.

[30] Foreign Application Priority Data
May 5, 1970 Great Britain .................. 21677/70

[52] U.S. Cl. ......................... 320/46, 73/24, 324/29
[51] Int. Cl. ..... G01n 27/42, G01n 31/00, H02j 7/04
[58] Field of Search ............ 320/46; 73/24; 324/29, 324/29.1

[56] References Cited
UNITED STATES PATENTS
2,963,899  12/1960  Martin et al. ........................ 73/24
2,874,564  2/1959  Martin et al. ........................ 73/24
2,514,235  7/1950  Genin et al. ........................ 320/46

FOREIGN PATENTS OR APPLICATIONS
798,323  7/1958  Great Britain ........................ 73/24

Primary Examiner—J. D. Miller
Assistant Examiner—Robert J. Hickey
Attorney, Agent, or Firm—Alfred H. Rosen; Frank Steinhilper

[57] ABSTRACT

Apparatus for detecting the evolution of gas, particularly from electric storage cells during charging of the cells, comprises a tube, inlet means for supplying the evolved gas to the tube, and electronic sensing means for detecting changes in the velocity of sound in the tube due to changes in the composition rate of evolution of the gas. In the described embodiment the sensing means consists of a transmitter mounted in the tube and emitting a series of sound pulses, a receiver in the tube spaced from the transmitter, and an electronic circuit for measuring the transit time of sound pulses travelling from the transmitter to the receiver through the gas in the tube.

12 Claims, 4 Drawing Figures

3,798,528
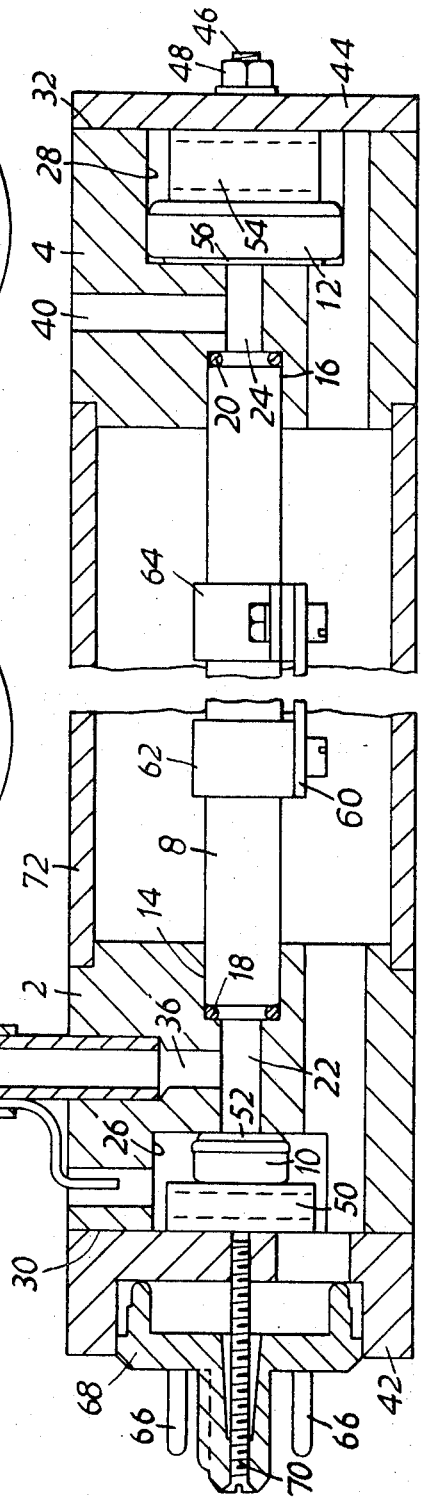
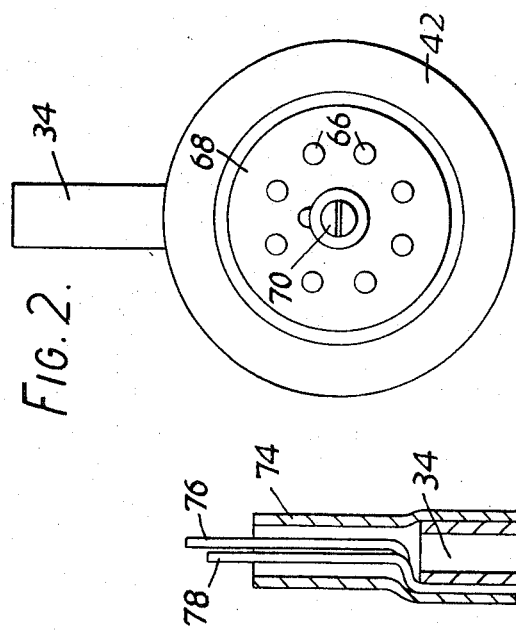
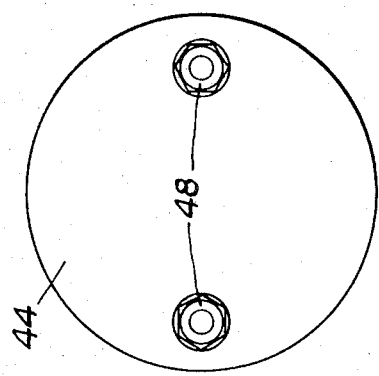
LINDSAY MOLYNEUX,
Inventor
By ROSEN & STEINHILPER, Attorneys

3,798,528

APPARATUS AND METHOD FOR DETECTING THE EVOLUTION OF GAS FROM AN ELECTRIC CELL AND FOR CONTROLLING THE CHARGING OF SAID CELL IN RESPONSE TO SAID DETECTION

This is a continuation, division, of application Ser. No. 140,043 filed May 4, 1971 and now abandoned.

This invention relates to apparatus for detecting the evolution of gas, and more particularly but not exclusively to apparatus for detecting the evolution of gas from an electric storage cell.

Each cell of a lead-acid battery in its discharged state accepts electrical energy and converts it into chemical energy which is stored on the plate of the cell. When the cell is fully charged, any electrical energy that is still fed into the cell will break down the water molecules in the acid solution into their oxygen and hydrogen components. The point at which the gas begins to be evolved from the cell, or gassing point, as it is known, is a very good indication of when the cell is practically charged, since, prior to the gassing point most of the electrical energy is, in fact, converted into chemical energy and after the gassing point most of it is being used to break up the water. A danger exists in not recognising the gassing point accurately. Firstly the break down of the water molecules results in a higher concentration of acid, which is detrimental to the performance of the cell and requires the addition of distilled water regularly. Secondly the hydrogen can be, and very often is, evolved in cracks in the plates of the cell and if the evolution of hydrogen is rapid the pressure build up in the plate can cause rupture of the plate material, which then falls to the bottom of the cell reducing the active area and ultimately short circuiting the plates.

According to this invention there is provided apparatus for detecting the evolution of gas, comprising a chamber, inlet means for supplying the evolved gas to the chamber, outlet means for allowing the gas to be expelled from the chamber, and electronic sensing means adapted to sense changes in the velocity of sound in the gas in the chamber.

Suitably, the chamber is an elongated tube and the inlet means and outlet means are arranged so that the evolved gas flows along the length of the tube.

Preferably, the electronic means comprises a transmitter mounted in the tube and adapted to produce sound pulses in the gas in the tube, a receiver axially spaced from the transmitter and adapted to receive the sound pulses and to generate a corresponding electrical output signal, and an electronic circuit connected between the transmitter and receiver and operable to sense changes in the time of transit of sound pulses through the gas in the tube from the transmitter to the receiver.

In one form of the invention, the apparatus is adapted to detect the evolution of gas from electric storage cells and the electronic circuit is adapted to produce an output signal which can be applied to a battery charger circuit thereby to control the charging current of the battery in dependence on the rate of evolution of gas from the cells of the battery.

The invention will now be described, by way of example, with reference to the accompanying drawings, in which:

FIG. 1 is a side elevation, partly in axial cross-section, of apparatus according to the invention, FIG. 2 is an end view looking from the left of FIG. 1;

FIG. 3 is an end elevation looking from the right of FIG. 1, and

Figure 4:
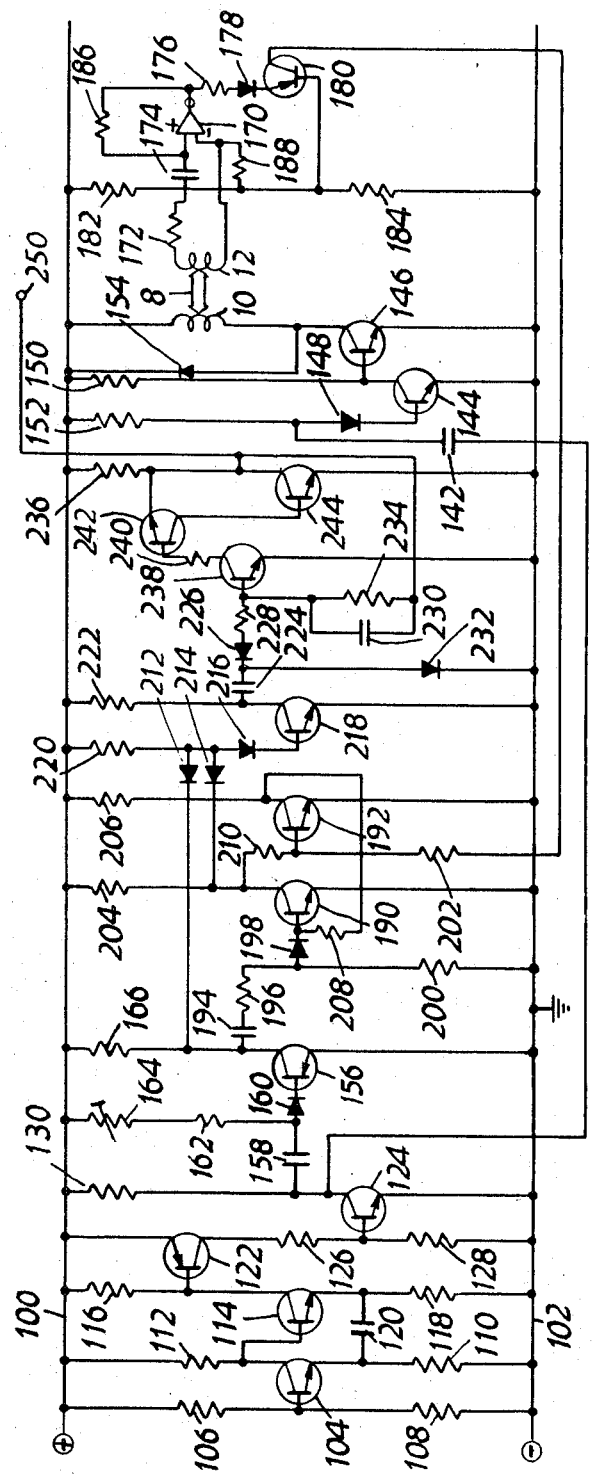
FIG. 4 is a diagram of the electronic sensing circuit of the apparatus.

The apparatus shown in the drawings is adapted to detect the evolution of gas from the cells of a lead-acid battery.

Referring to the drawings, the apparatus comprises a tube 8 of acrylic plastics mounted between retaining blocks 2 and 4, one at each end of the tube, electrical transducers 10 and 12 mounted one on each retaining block for respectively transmitting and receiving sound pulses passing through the tube 8, and an electronic sensing circuit (FIG. 4) connected between the transducers.

The tube 8 of acrylic plastics is of uniform circular cross-section and is mounted between two retaining blocks 2 and 4 of plastics, each end of the tube 8 fitting into a counterbore 14 and 16 in the associated block, the junctions between the tube 8 and blocks 2 and 4 being sealed by means of O-rings 18 and 20. A bore 22, 24 in each of the retaining blocks 2 and 4 extends from the end of the tube 8 and opens into a counterbore 26, 28 in a flat end face 30, 32 of each block perpendicular to the axis of the tube 8, each counterbore housing one of the transducers 10 and 12 as described below. A branch 36 of the bore 22 in the block 2 leads to a side face of the block 2 and communicates with an inlet tube 34 through which gas can be admitted to the tube 8. A similar branch 40 of the bore 24 in the other block 4 provides an outlet for the gas flowing through tube 8.

An end cap 42 of plastics abuts end face 30 of retaining block 2, and an end cap 44 similarly abuts end face 32 of retaining block 4. The end caps 42 and 44 are held in position by means of a pair of studs 46 extending the length of the apparatus between the end caps and bearing nuts 48 at each end. The nuts at the left hand end of the apparatus of FIG. 1 have been omitted from the drawing for the sake of clarity.

A transmitter transducer 10, in the form of an earphone, is mounted in the counterbore 26 in the retaining block 2, and is held in place by a resilient mounting consisting of a short length of PVC tube 50 disposed between the end cap 42 and the transmitter 10 with its axis transverse to the axis of tube 8. The transmitter 10 is positioned so as to overlie the end of the bore 22 in the block 2, and a seal 52, consisting of a thin film of acid-resistant polyester material known by the trade mark MELINEX, is disposed between the transmitter 10 and the face of the counterbore 26 into which bore 22 opens. The seal 52 both provides a gas-tight seal to prevent leakage of gas from tube 8 and also prevents damage to transmitter 10 from acid vapours from the lead-acid battery to which the apparatus is connected.

A receiver transducer, in the form of a microphone 12, is similarly mounted in the counterbore 28 in retaining block 4 by means of a length of PVC tube 54 so as to overlie the opening of the bore 24, a MELINEX seal 56 being interposed between the microphone 12 and the face of counterbore 28.

Some of the components of the electronic sensing circuit are mounted on a printed circuit board 60 attached to tube 8 by means of a pair of cable clips 62 and 64. Leads (not shown) from the transducers 10 and 12 and the printed circuit board 60 are connected to the various pins 66 of a plug 68 fixed to the end cap 42 by means of a screw 70. The tube 8, printed circuit board 60 and the various leads are enclosed by a protective sleeve 72 of plastics held between the retaining blocks 2 and 4.

The inlet tube 34 is, in use, connected to a lead-acid battery through a flexible tube 74 whose free end passes through a bung (not shown) adapted to fit into the vent plug of the battery. A pair of electrical leads 76, 78 extend from a microswitch mounted in the bung to the electronic circuit, the microswitch being opened if the tube 74 becomes detached from the battery so that an indication that this has happened is given by the electronic circuit.

Referring to FIG. 4, the electronic sensing circuit is fed from a low-voltage d.c. source having a positive line 100 and a negative line 102. The circuit includes a multivibrator comprising a first n-p-n transistor 104, whose base is connected to the junction of two resistors 106 and 108 connected in series between the positive line 100 and the negative line 102 of the supply. The emitter of transistor 104 is connected to the negative line 102 through a resistor 110, and the collector of transistor 104 is connected to the positive line 100 through a resistor 112 and to the base of a second n-p-n transistor 114. The collector of transistor 114 is connected through a resistor 116 to the positive line 100, whilst its emitter is connected to the negative line through a resistor 118. A capacitor 120 is connected between the emitters of transistors 104 and 114. The multivibrator is arranged to give a square wave output at the collector of transistor 114 with a frequency of about 50 cycles per second and a period width of about 10 milliseconds.

The output from the multivibrator is fed to an amplifier comprising a p-n-p transistor 122 and an n-p-n transistor 124. The base of transistor 122 is connected to the collector of transistor 114, its emitter is connected to the positive line 100 and its collector is connected to the negative line 102 through resistors 126 and 128 in series. The base of transistor 124 is connected to the junction of resistors 126 and 128, its collector is connected through a resistor 130 to the positive line 100 and its emitter is connected to the negative line 102. The output at the collector of transistor 124 is approximately a square wave of frequency 50 cycles per second and with an amplitude roughly equal to the supply voltage.

One output from transistor 124 is supplied to the transmitter 10 through a coupling capacitor 142 of low capacitance, an n-p-n transistor 144 and an n-p-n transistor 146 which acts as an amplifier. Thus the collector of transistor 124 is connected through capacitor 142 and a diode 148 to the base of transistor 144, whose collector is connected to the positive line 100 through a resistor 150 and whose emitter is connected to the negative line 102. A resistor 152 is connected between the positive line 100 and the anode of diode 148. The collector of transistor 144 is connected to the base of transistor 146, whose emitter is connected to the negative line 102 and whose collector is connected through the transmitter 10 to the positive line 100. A diode 154 is connected across the transmitter 10, the anode of diode 154 being connected to the collector of transistor 146. Owing to the low capacitance of coupling capacitor 142, the output of transistor 146 is a series of sharp pulses. Thus the transmitter 10 emits sharp pulses of sound at a frequency of 50 cycles per second.

A further output from transistor 124 is supplied through a timing circuit to the base of an n-p-n transistor 156. The timing circuit consists of a capacitor 158, one plate of which is connected to the collector of transistor 124 and the other plate of which is connected through a diode 160 to the base of transistor 156, and a resistor 162 and variable resistor 164 connected in series between the positive line 100 and the junction of capacitor 158 and diode 160. The collector of transistor 156 is connected through a resistor 166 to the positive line 100 whilst its emitter is connected to the negative line 102. As, in operation, the potential of the collector of transistor 124 falls sharply towards the potential of the negative line, the base of transistor 156 is driven negative to render it non-conducting. Capacitor 158 then begins to charge through resistors 162 and 164, so that the potential of the base of transistor 156 rises until the transistor is again rendered conducting after a period dependent on the time constant of capacitor 156 and resistors 162 and 164. Variable resistor 164 is adjusted so that this period is approximately one millisecond. Thus, in operation, the potential of the collector of transistor 156, which is normally at the potential of the negative line, rises sharply to a positive value at the same time as a pulse of sound is emitted from the transmitter 10, and remains positive for a fixed period of approximately one millisecond.

The receiver transducer 12 receives each sound pulse emitted from the transmitter after a time interval dependent on the velocity of sound in the air or gas in the tube 8. The receiver transducer thus produces a series of short electrical pulses which are supplied, through a resistor 172 and a capacitor 174, to an operational amplifier 170. The output of the amplifier 170 is connected through a resistor 176 and a diode 178 to the emitter of a p-n-p transistor 180, whose base is connected to the junction of resistors 182 and 184 connected in series between the positive and negative lines 100 and 102. A resistor 186 is connected between the negative input and the output of operational amplifier 170, and a further resistor 188 is connected between the positive input of the operational amplifier 170 and the junction of resistors 182 and 184. The output of the receiver transducer 12 thus appears amplified at the collector of transistor 180 as short pulses, delayed from the pulses appearing at the collector of transistor 124 by a period dependent on the velocity of sound in the tube 8.

The outputs of the transistors 156 and 180 are supplied to respective n-p-n transistors 190 and 192 of a bistable circuit. Thus the collector of transistor 156 is connected through a capacitor 194, resistor 196 and diode 198 to the base of transistor 190, a further resistor 200 being connected between the anode of diode 198 and the negative line 102. The collector of transistor 180 is connected through a resistor 202 to the base of transistor 192. The collectors of transistors 190 and 192 are connected to the positive line 100 through respective resistors 204 and 206, their emitters being connected to the negative line 102. The base of transistor 190 is connected to the collector of transistor 192 through a resistor 208, whilst the collector of transistor 190 is connected to the base of transistor 192 through a resistor 210. When the collector of transistor 156 rises sharply to a positive value, the positive potential is applied to the base of transistor 190, which is rendered conducting, transistor 192 being rendered non-conducting since its base potential falls towards the potential of the negative line. Capacitor 194 then begins to discharge through resistor 200, the plate connected to resistor 196 becoming less positive. Transistor 190, however, remains conducting, base current flowing through resistors 206 and 208, until a positive pulse is supplied by transistor 180 to the base of transistor 192 of the bistable circuit, rendering transistor 192 conducting and thereby switching off transistor 190.

The collectors of transistor 156 of the timing circuit and transistor 190 of the bistable circuit are also connected through respective diodes 212 and 214 and a common diode 216 to the base of an n-p-n transistor 218, the anodes of diodes 212, 214 and 216 being connected together and through a resistor 220 to the positive line 100. The collector of transistor 218 is connected to the positive line through a resistor 222 whilst its emitter is connected to the negative line. If either of transistors 156 and 190 is conducting, the base of transistor 218 is driven negative, so that the transistor is non-conducting, transistor 218 being rendered conducting only if both transistors 156 and 190 are non-conducting, so that base current can flow to transistor 218 through resistor 210 and diode 216. Thus the transistor 218 acts as a "NAND" gate, an output (i.e. a negative excursion) appearing at the collector of the transistor only if the collectors of transistor 156 and 190 are positive simultaneously. This can only occur if the pulse from the receiver transducer 12 supplied through transistor 180 is applied to transistor 192 of the bistable circuit before the end of the one millisecond period during which the collector of transistor 156 is at a positive potential, i.e. if the time of transit of the sound pulse from the transmitter 10 to the receiver transducer 12 is less than one millisecond. If that is the case, then an output potential appears at the collector of transistor 218 for a period equal to the difference between 1 millisecond and the transit time of a sound pulse through tube 8.

The output pulses from transistor 218 are supplied through a coupling capacitor 224, diode 226 and resistor 228 to a capacitor 230 forming part of a Miller integrator circuit. A diode 232 is connected between the coupling capacitor 224 and the negative line to maintain the capacitor in a charged condition so that negative-going pulses are supplied to capacitor 230. A resistor 234 is connected across capacitor 230, and one plate of the capacitor is connected to the positive line through a resistor 236 whilst the other plate of the capacitor is connected to the base of a p-n-p transistor 238. The emitter of transistor 238 is connected to the negative line whilst its collector is connected through a resistor 240 to the base of a p-n-p transistor 242. The emitter of transistor 242 is connected to the junction of capacitor 230 and resistor 236, whilst its collector is connected to the base of an n-p-n transistor 244 whose emitter is connected to the negative line and whose collector is connected to the emitter of transistor 242. Transistors 240, 242 and 244 form a high gain amplifier, providing an output at the collector of transistor 244 which is dependent on the duration of the output pulses of transistor 218 and therefore on the time of transit of pulses of sound through the tube 8. The output at terminal 250 is therefore dependent on the velocity of sound in the air or gas in tube 8.

The operational amplifier 170, transistor 180 and associated circuitry and the components of the Miller integrator circuit are mounted on the printed circuit board 60 (FIG. 1), so as to minimise interference in the signal from the receiver transducer 12. The remaining components of the circuitry are contained in a separate unit and connected to the components on the printed circuit board via the plug 66.

The microswitch (not shown) connected to the leads 76 and 78 (FIG. 1) and which is closed when the apparatus is correctly connected to the battery, may be inserted at various points in the circuit, for example in the supply to the transmitter 10. In any case, the effect of opening the microswitch will be to give an indication to the operator that the apparatus is not connected to the battery.

The apparatus may be used in conjunction with a controlled battery charger of the kind described in co-pending U.S. application No. 26,694 now U.S. Pat. No. 3,629,681, to control the charging of a lead-acid battery. To this end, the free end of the inlet tube 34 of the apparatus is inserted into the vent plug of the battery to be charged, so that hydrogen evolved from the battery will pass into and through the tube 8. The tube 8 is mounted at an angle to the horizontal, with its outlet end higher than its inlet end, so that as hydrogen from the battery passes through the tube 8, ambient air enters the tube at a predetermined rate through a small hole (not shown) in the inlet tube 34. The size of the hole and the angle at which the tube 8 is fixed are chosen so as to give to the apparatus the desired sensitivity to changes in the rate of evolution of hydrogen from the battery. The electronic circuit of the apparatus is connected to a d.c. source derived from the supply to the battery charger, and the output signal from the apparatus is applied to the control circuit of the battery charger so as to influence the rate of charging of the battery.

In operation, the battery initially receives the full charging current from the battery charger. When the battery has been charged to about 70 percent of its capacity, hydrogen begins to be given off, owing to the breakdown of water molecules by a proportion of the electrical energy supplied to the cells of the battery. The hydrogen evolved passes through the tube 8, so that the tube contains a mixture of air and hydrogen. As the hydrogen in the tube 8 is continually replaced by air entering through the hole in the inlet tube 34 at a predetermined rate, the proportion of hydrogen in the tube 8 at any moment depends on the rate of evolution of hydrogen from the battery. As the velocity of sound in a hydrogen-air mixture is greater than that in air alone, the transit time of sound pulses passing through the tube 8 is reduced, with the result that the output signal from the apparatus is increased. This causes the charger controller to reduce the rate of charging of the battery. As the battery is charged further, the rate of evolution of hydrogen tends to increase, and the rate of charge of the battery is correspondingly reduced, until when the battery is fully charged the charging current is reduced to a very small value.

As the battery moves towards its fully charged state, the temperature of the battery and of the evolved hydrogen tends to rise. The rise in temperature of the hydrogen causes an increase in the velocity of sound in the mixture in the tube 8, so that any increase in temperature enhances the effect of the evolution of hydrogen.

The apparatus is arranged so that the transmitter transducer 10 is at the input end of the tube 8. Thus any increase in the rate of flow of gas through the tube due to an increased evolution of hydrogen will enhance the increase in velocity of sound pulses from the transmitter to the receiver, though this effect is of course slight compared with the effect of an increase in the proportion of hydrogen in the tube.

In certain circumstances the provision of a hole in the inlet tube 34 is not necessary. Thus there may be sufficient diffusion of air into the tube 8 to provide an adequate rate of replacement of gas in the tube by air.

It will be apparent that many modifications could be made in the described embodiment. For example, the circuit could be arranged so that an output signal was produced only when the transit time of sound pulses in the tube reached a predetermined value, the rate of charging of the battery being reduced on receipt of the output signal by the battery charger. The circuit could be arranged to give a visual or audible signal dependent on the output signal from the circuit.

It will also be appreciated that the apparatus of this invention can be used in other circumstances where it is required to detect the evolution of a gas, apart from its use in connection with battery charging.

I claim:

1. Apparatus for controlling the charging of a rechargeable battery having charging means connected thereto, said apparatus being responsive to gas evolved from a cell or cells of the battery during charging thereof and comprising, a chamber, inlet means for leading a supply of the cell-evolved gas to the chamber at a rate dependent upon the rate of evolution of said gas by the battery during charging thereof, outlet means at a location remote from the inlet means for expulsion of gas from the chamber, means in the vicinity of said inlet means for allowing ingress of ambient air into the chamber to displace gas from the chamber, and electronic sensing means for sensing changes in the velocity of sound in the gas-air mixture in the chamber, and for providing an output signal for controlling said charging means.

2. Apparatus according to claim 1 including an aperture in said inlet means for admitting air to said chamber.

3. Apparatus according to claim 1 in which said chamber admits air by diffusion for replacement of said cell-evolved gas.

4. Apparatus as claimed in claim 1, in which the electronic sensing circuit includes means to provide a signal in dependence upon the evolution of gas from the cells.

5. Apparatus as claimed in claim 1, in which the chamber is an elongated tube and the inlet means and outlet means are arranged so that the evolved gas flows along the length of the tube, and in which the inlet means includes an air inlet open to the ambient air, for replacing evolved gas in the tube with air.

6. Apparatus according to claim 1 in which the electronic sensing means comprises a transmitter mounted in the chamber, pulse generator means operable to energize the transmitter to emit a series of sound pulses of short duration, a receiver mounted in the chamber spaced from the transmitter for receiving the sound pulses and generating a corresponding electrical output signal, and circuit means operable to measure the time of transit of each sound pulse from the transmitter to the receiver.

7. Apparatus as claimed in claim 6, in which said pulse generator means is operable to energise the transmitter to emit sound pulses at a constant frequency, and said circuit means comprises a timing circuit operable to generate electrical reference pulses of fixed duration at the same frequency as that of the sound pulses, and comparator means for comparing the time of transit of a sound pulse from the transmitter to the receiver with the duration of the electrical reference pulses.

8. Apparatus as claimed in claim 7, in which the electronic circuit includes a bistable circuit adapted to be placed in a first stable condition when a sound pulse is emitted by the transmitter and to be placed in a second stable condition when the sound pulse is received by the receiver, and the said comparator means comprises gate means for providing a electrical signal when the bistable circuit is in its second stable condition during the duration of one of the electrical reference pulses, and integrating circuit means adapted to receive the electrical signals from the gate means and to provide an electrical output signal dependent on the duration of the electrical signals and therefore on the transit time of the sound pulses.

9. Battery charging control system for a lead-acid storage battery comprising charging means for said battery, apparatus for detecting gas evolved from the electric storage cells of the battery during charging thereof, the apparatus comprising a chamber having an inlet for connection to said cells so that gas evolved from the cells during charging thereof is supplied to the chamber and an outlet for allowing the gas to be expelled from the chamber, means for replacing cell-evolved gas in the chamber with another gas at a predetermined rate that is essentially independent of the rate of evolution of gas from the cells whereby the proportion of cell-evolved gas in the chamber at any moment depends on the rate of evolution of cell-evolved gas from the cells, and electronic sensing means for sensing changes in the velocity of sound in the mixture of gasses in the chamber, and for providing an output signal for controlling said charging means.

10. In combination with charging means for a lead-acid battery, apparatus for detecting the evolution of gas from the cells of the battery during charging thereof, the apparatus comprising a chamber, inlet means for connection to the battery so that gas evolved from the cells is supplied to the chamber, outlet means for expulsion of gas from the chamber, means for allowing the ingress of ambient air into the chamber, and electronic sensing means for sensing changes in the velocity of sound in the gas-air mixture in the chamber, the sensing means providing a signal to the charging means to control the rate of charging current supplied to the battery in dependence on the rate of evolution of gas from the cells.

11. Apparatus for controlling the charging of a rechargeable battery having charging means connected thereto, said apparatus being responsive to gas evolved from a cell or cells of the battery during charging thereof and comprising, a chamber, inlet means for leading a supply of the cell-evolved gas to the chamber at a rate dependent upon the rate of evolution of said gas by the battery during charging thereof, outlet means for allowing gas to be expelled from the chamber at a location remote from the inlet means, means in the vicinity of said inlet means for replacing cell-evolved gas in the chamber with another gas at a rate that is essentially independent of the rate of evolution of cell-evolved gas by the battery whereby the proportion of cell-evolved gas in the chamber at any moment depends on the rate of evolution of cell-evolved gas from the battery, and electronic sensing means for sensing changes in the velocity of sound in the mixture of gasses in the chamber, and for providing an output signal for controlling said charging means.

12. Method of controlling the charging of a rechargeable battery having a cell or cells from which gas is evolved during charging thereof comprising the steps of charging the battery, during charging thereof leading a supply of cell-evolved gas along a prescribed path, mixing with said cell-evolved gas in said path another gas at a rate that is independent of the rate of evolution of cell-evolved gas, determining the velocity of sound in the mixture of gasses in said path, generating a control signal in dependence upon said velocity, and applying said signal to control the charging of the battery.

* * * * *